(12) United States Patent  
Urynowicz et al.

(10) Patent No.: US 7,556,094 B1  
(45) Date of Patent: Jul. 7, 2009

(54) METHOD FOR CONVERTING COAL TO BIOGENIC METHANE

(75) Inventors: Michael A. Urynowicz, Fort Collins, CO (US); Franco Basile, Ft. Collins, CO (US); David M. Bagley, Laramie, WY (US); Song Jin, Laramie, WY (US)

(73) Assignee: University of Wyoming, Laramie, WY (US)

( * ) Notice: Subject to any disclaimer, the term of this patent is extended or adjusted under 35 U.S.C. 154(b) by 0 days.

(21) Appl. No.: 11/584,206

(22) Filed: Oct. 21, 2006

Related U.S. Application Data

(60) Provisional application No. 60/731,760, filed on Oct. 31, 2005.

(51) Int. Cl.  
*E21B 43/22* (2006.01)

(52) U.S. Cl. ........................... 166/246; 435/167

(58) Field of Classification Search ............... 166/246  
See application file for complete search history.

(56) References Cited

U.S. PATENT DOCUMENTS

| | | | | |
|---|---|---|---|---|
| 4,826,769 | A | * | 5/1989 | Menger ................. 435/167 |
| 6,143,534 | A | * | 11/2000 | Menger et al. ........... 435/167 |
| 2004/0033557 | A1 | * | 2/2004 | Scott et al. ............. 435/42 |
| 2007/0248531 | A1 | * | 10/2007 | Debryun et al. .......... 423/650 |

* cited by examiner

*Primary Examiner*—William P Neuder  
(74) *Attorney, Agent, or Firm*—Emery L. Tracy

(57) ABSTRACT

A method for converting coal to biogenic methane is provided. The method comprises providing a solid coal matrix, converting the solid coal matrix into soluble, coal-derived constituents, introducing indigenous microorganisms and nutrients into the soluble, coal-derived constituents, and biologically converting the soluble, coal-derived constituents into methane.

9 Claims, 4 Drawing Sheets

Steps Required to Convert Coal to Biogenic Methane

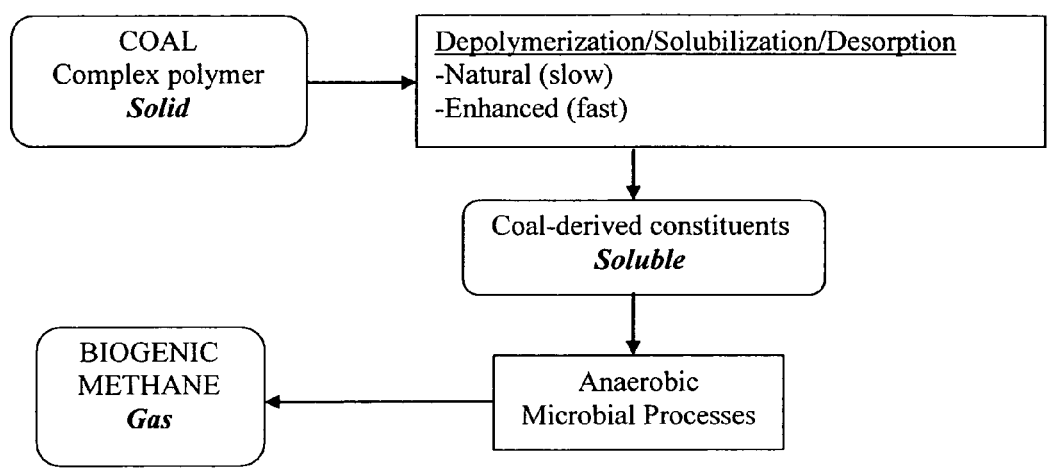
Figure 1. Steps Required to Convert Coal to Biogenic Methane

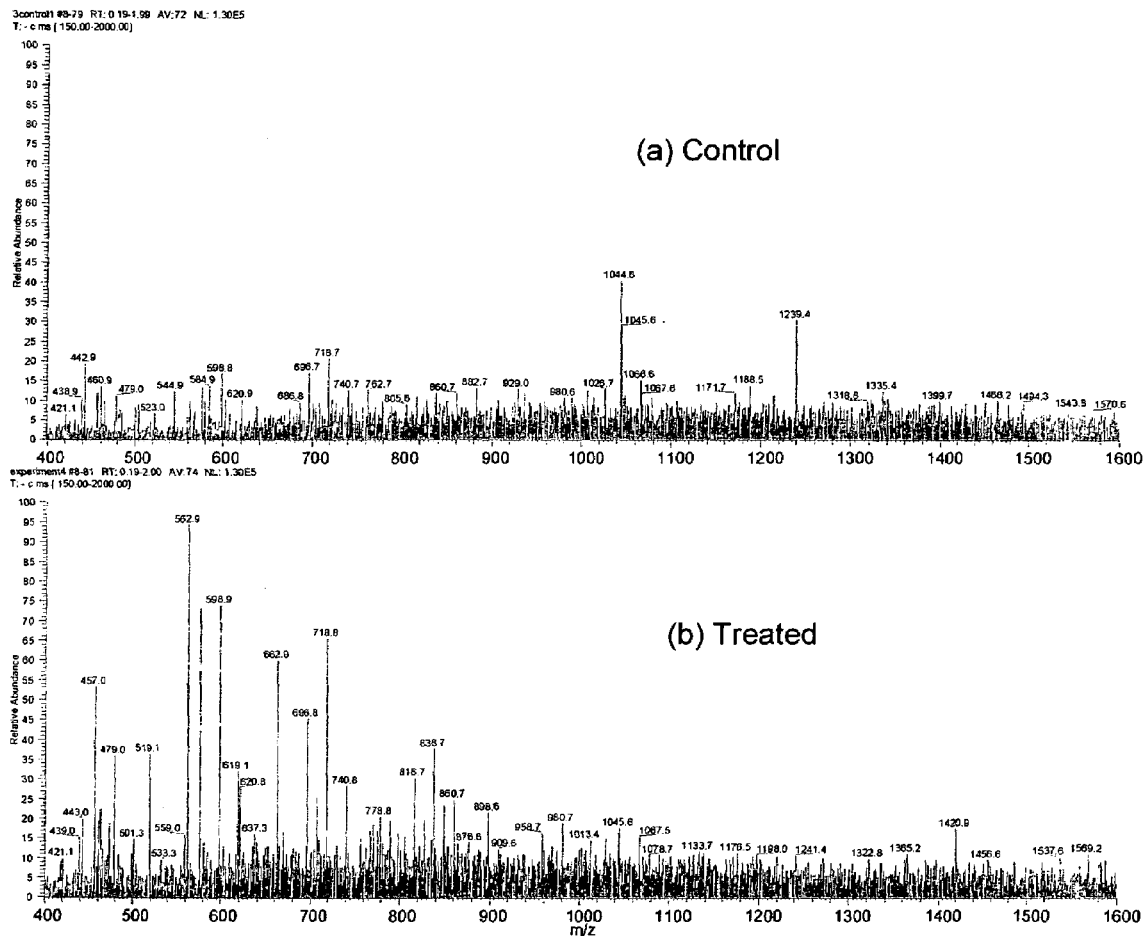
Figure 2. Negative Ion Electrospray Ionization (NI-ESI) Mass Spectra of (a) Control and (b) Treated Water-soluble Fraction in Coal Samples. Sample treated with sodium hydroxide at a pH of 4.0 for a period of 24 hours. Sample Introduced by Direct Infusion (No Chromatography). Instrument: Electrospray Ionization (ESI) Quadrupole Ion-trap Mass Spectrometer.

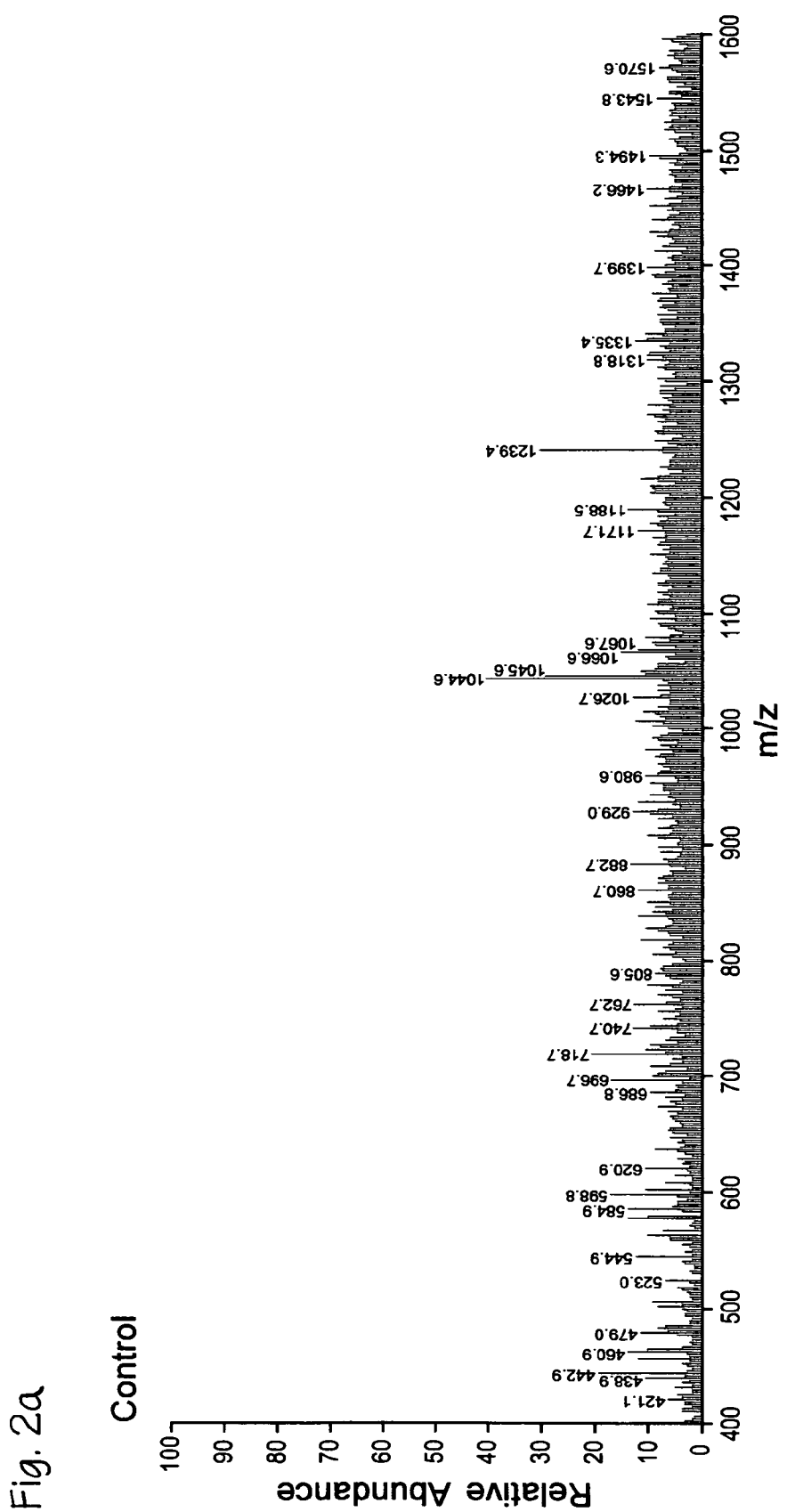
Fig. 2a Control

METHOD FOR CONVERTING COAL TO BIOGENIC METHANE

The present application claims the benefit of priority of provisional patent application Ser. No. 60/731,760, filed on Oct. 31, 2005, entitled "System and Method for Converting Coal to Biogenic Methane".

BACKGROUND OF THE INVENTION

Coal bed methane (CBM) is natural gas trapped within coal by the pressure exerted by groundwater. Conservative estimates suggest that more than 700 trillion cubic feet of coal bed methane is available within the United States. The Powder River Basin (PBR), located in northeast Wyoming and southeast Montana, is thought to contain between 25 and 30 trillion cubic feet of recoverable natural gas. Recent studies have shown the presence of ongoing secondary biogenic coal bed methane production within the Powder River Basin and across the country. Coal is a relatively insoluble, complex solid polymer. Nevertheless, it is believed that coal is the primary source of substrate(s) utilized by the anaerobic bacteria responsible for secondary biogenic methane production.

SUMMARY

The present invention is a method for converting coal to biogenic methane. The method comprises providing a solid coal matrix, converting the solid coal matrix into soluble, coal-derived constituents, introducing indigenous microorganisms into the soluble, coal-derived constituents, and biologically converting the soluble, coal-derived constituents into methane.

BRIEF DESCRIPTION OF THE DRAWINGS

FIG. 1 is a flow chart illustrating the steps required to convert coal to biogenic methane, in accordance with the present invention.

DETAILED DESCRIPTION OF THE PREFERRED EMBODIMENTS

Figure 2B:
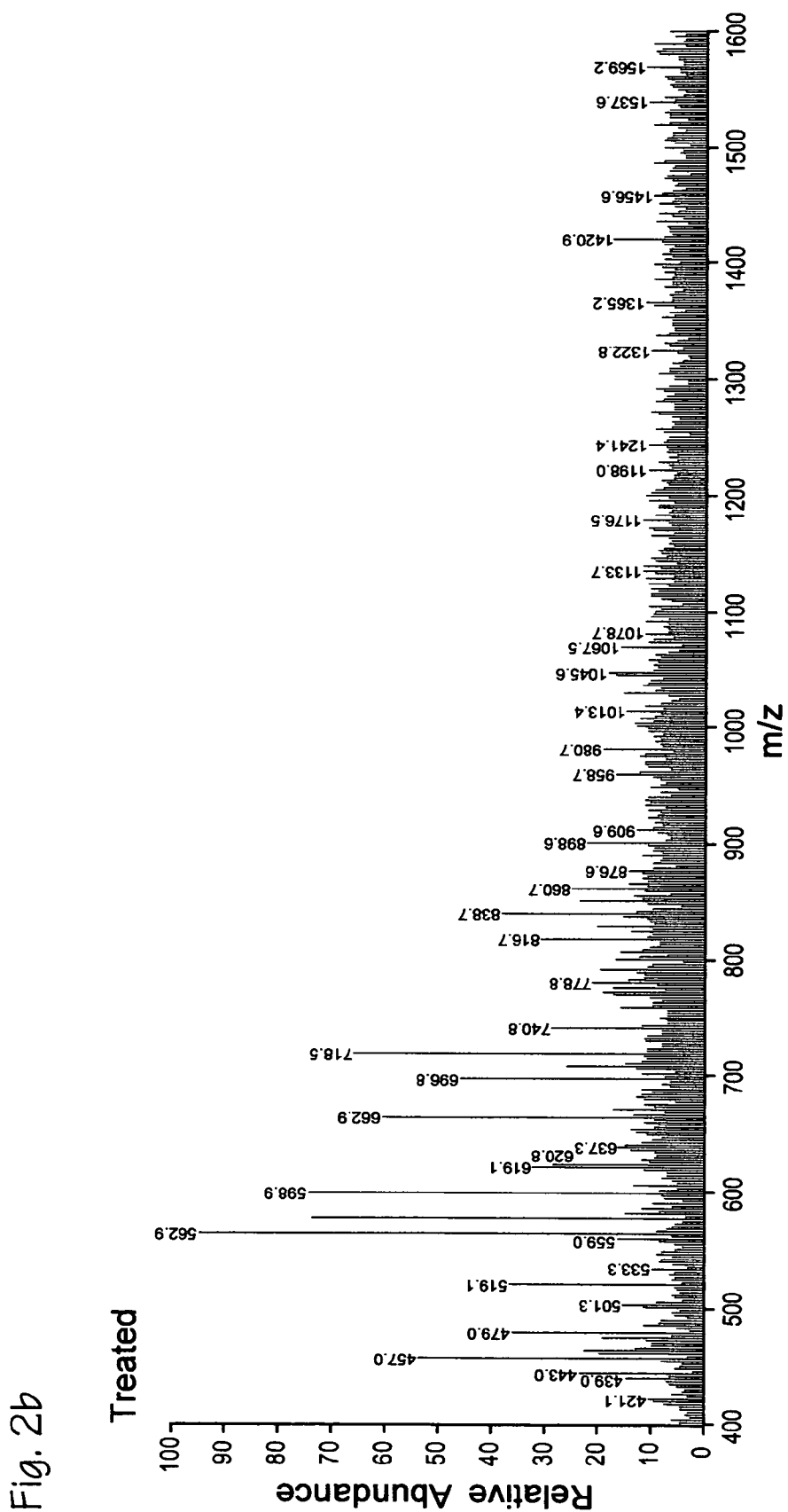
FIG. 2 are graphs illustrating negative ion electrospray ionization mass spectra of (a) control and (b) treated water-soluble fraction in coal samples.

The present invention is a method for converting coal to biogenic methane using an in-situ coal depolymerization and solubilization technologies. The method of the present invention transforms a fraction of the solid coal matrix into soluble constituents that are more readily bio-available thereby enhancing the production of secondary biogenic coal bed methane.

With the method of the present invention, the biogenic conversion of coal, a complex, solid polymer, to methane has two steps, as best illustrated in FIG. 1. The first step converts the solid coal matrix into soluble constituents. This complex step has been designated depolymerization/solubilization/desorption because all three mechanisms may be involved. The second major step performed by indigenous microorganisms, biologically converts the soluble, coal-derived constituents into methane.

Under natural conditions, using the method of the present invention, coal can be solubilized sufficiently to facilitate biogenic methane production. Preliminary experiments performed at the University of Wyoming with Powder River Basin coal also suggest that various treatment methods, including acids (hydrochloric acid, sulfuric acid, and nitric acid), bases (sodium hydroxide and other alkali substances with and without acid pretreatment), oxidants (potassium permanganate, Fenton's reagent, oxalic acid, peracetic acid, and persulfate) and solvents (anthracene, n-hexane, acetone, pyridine, ethanol, and methanol) can significantly increase the available dissolved organic carbon as illustrated by high to low molecular weight shifts (FIG. 2). The treatment agent(s) used and method(s) of application are determined by site specific conditions. Various enabling technologies including hydraulic and pneumatic fracturing and stream injection may also be employed.

Because coal is a polymer, a reservoir of smaller molecular weight organic compounds exists within coal deposits. The depolymerization and solubilization of coal is the rate-limiting step for the production of secondary biogenic coal bed methane. In-situ coal depolymerization and solubilization technologies can therefore be used to transform a fraction of the solid coal matrix into soluble constituents that are more readily bio-available, thereby enhancing the production of secondary biogenic coal bed methane. The in-situ method of the present invention including, but not limited to, the injection of acids, bases, oxidants, and solvents, transforms a fraction of coal into coal-derived substrates that specifically enhance biogenic methane production. The method of the present invention can be used to continuously provide methane from coal beds that would otherwise become exhausted.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A method for converting in-situ coal to biogenic methane, the method comprising:
    in-situ injecting of at least one treatment agent into existing fractures or cleats within an in-situ coal seam, the least one treatment agent selected from the group consisting of acids, bases oxidants, and solvents into the solid coal matrix transforming a fraction of coal into coal-derived substrates, increasing the available dissolved organic carbon in the coal-derived substrates, and enhancing the production of secondary biogenic coal bed methane;
    in-situ converting of a fraction of the solid coal matrix into coal-derived substrates using one of depolymerization and solubilization;
    introducing nutrients into the coal-derived substrates; and
    biologically converting the coal-derived substrates into methane;
    wherein the acids are selected from the group consisting of hydrochloric acid, sulfuric acid, and nitric acid.

2. The method of claim 1 and further comprising:
    in-situ converting of a fraction of the solid coal matrix into coal-derived substrates using depolymerization and solubilization.

3. The method of claim 1 and further comprising:
    in-situ converting of a fraction of the solid coal matrix into coal-derived substrates using two of depolymerization and solubilization.

4. A method for converting coal to biogenic methane, the method comprising:
- providing a solid coal matrix;
- introducing a treatment agent selected from the group consisting of acids, bases, oxidants, and solvents into the solid coal matrix transforming a fraction of coal into coal-derived substrates, increasing the available dissolved organic carbon, and enhancing the production of secondary biogenic coal bed methane;
- increasing available dissolved organic carbon in the coal-derived substrates;
- introducing nutrients into the coal-derived substrates; and
- biologically converting the coal-derived substrates into methane;
- wherein the oxidants are selected from the group consisting of potassium permanganate, Fenton's reagent, oxalic acid, peracetic acid, and persulfate.

5. A method for converting coal to biogenic methane, the method comprising:
- providing a solid coal matrix;
- introducing a treatment agent selected from the group consisting of acids, bases, oxidants, and solvents into the solid coal matrix transforming a fraction of coal into coal-derived substrates, increasing the available dissolved organic carbon, and enhancing the production of secondary biogenic coal bed methane;
- increasing available dissolved organic carbon in the coal-derived substrates;
- introducing nutrients into the coal-derived substrates; and
- biologically converting the coal-derived substrates into methane;
- wherein the solvents are selected from the group consisting of anthracene, n-hexane, acetone, pyridine, ethanol, and methanol.

6. A method for converting in-situ coal to biogenic methane, the method comprising:
- in-situ injecting of at least one treatment agent into existing fractures or cleats within an in-situ coal seam, the least one treatment agent selected from the group consisting of acids, bases, oxidants, and solvents into the solid coal matrix transforming a fraction of coal into coal-derived substrates in the coal-derived substrates, increasing the available dissolved organic carbon, and enhancing the production of secondary biogenic coal bed methane;
- in-situ converting of a fraction of the solid coal matrix into coal-derived substrates using one of depolymerization and solubilization;
- introducing nutrients into the coal-derived substrates; and
- biologically converting the coal-derived substrates into methane;
- wherein the bases are selected from the group consisting of sodium hydroxide and other alkali substances with and without acid pretreatment.

7. A method for converting in-situ coal to biogenic methane, the method comprising:
- in-situ injecting of at least one treatment agent into existing fractures or cleats within an in-situ coal seam, the least one treatment agent selected from the group consisting of acids, bases, oxidants, and solvents into the solid coal matrix transforming a fraction of coal into coal-derived substrates, increasing the available dissolved organic carbon in the coal-derived substrates, and enhancing the production of secondary biogenic coal bed methane;
- in-situ converting of a fraction of the solid coal matrix into coal-derived substrates using one of depolymerization and solubilization;
- introducing nutrients into the coal-derived substrates; and
- biologically converting the coal-derived substrates into methane;
- wherein the oxidants are selected from the group consisting of potassium permanganate, Fenton's reagent, oxalic acid, peracetic acid, and persulfate.

8. A method for converting in-situ coal to biogenic methane, the method comprising:
- in-situ injecting of at least one treatment agent into existing fractures or cleats within an in-situ coal seam, the least one treatment agent selected from the group consisting of acids, bases, oxidants, and solvents into the solid coal matrix transforming a fraction of coal into coal-derived substrates, increasing the available dissolved organic carbon in the coal-derived substrates, and enhancing the production of secondary biogenic coal bed methane;
- in-situ converting of a fraction of the solid coal matrix into coal-derived substrates using one of depolymerization and solubilization;
- introducing nutrients into the coal-derived substrates; and
- biologically converting the coal-derived substrates into methane;
- wherein the solvents are selected from the group consisting of anthracene, n-hexane, acetone, pyridine, ethanol, and methanol.

9. A method for converting in-situ coal to biogenic methane, the method comprising:
- in-situ injecting of at least one treatment agent into existing fractures or cleats within an in-situ coal seam, the least one treatment agent selected from the group consisting of acids, bases, oxidants, and solvents into the solid coal matrix transforming a fraction of coal into coal-derived substrates, increasing the available dissolved organic carbon in the coal-derived substrates, and enhancing the production of secondary biogenic coal bed methane;
- in-situ converting of a fraction of the solid coal matrix into coal-derived substrates using one of depolymerization and solubilization;
- introducing nutrients into the coal-derived substrates; and
- biologically converting the coal-derived substrates into methane;
- wherein hydraulic and pneumatic fracturing and steam injection are used to aid in the delivery of the treatment agents.

* * * * *